United States Patent
Wang et al.

(10) Patent No.: US 12,120,593 B2
(45) Date of Patent: Oct. 15, 2024

(54) METHOD, DEVICE AND COMPUTER READABLE MEDIUM FOR CONTROLLING D2D ROUTING

(71) Applicant: NOKIA SOLUTIONS AND NETWORKS OY, Espoo (FI)

(72) Inventors: Zhi Wang, Shandong (CN); Yigang Cai, Naperville, IL (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 327 days.

(21) Appl. No.: 17/629,905

(22) PCT Filed: Jul. 26, 2019

(86) PCT No.: PCT/CN2019/097911
§ 371 (c)(1),
(2) Date: Jan. 25, 2022

(87) PCT Pub. No.: WO2021/016741
PCT Pub. Date: Feb. 4, 2021

(65) Prior Publication Data
US 2022/0256434 A1 Aug. 11, 2022

(51) Int. Cl.
H04W 40/00 (2009.01)
H04W 4/02 (2018.01)
H04W 40/20 (2009.01)

(52) U.S. Cl.
CPC ........... *H04W 40/20* (2013.01); *H04W 4/023* (2013.01)

(58) Field of Classification Search
CPC .............................. H04W 40/20; H04W 4/023
See application file for complete search history.

(56) References Cited

U.S. PATENT DOCUMENTS

| 10,021,570 B1 | 7/2018 | Cai |
| 2014/0335791 A1 | 11/2014 | Kim et al. |

(Continued)

FOREIGN PATENT DOCUMENTS

| CN | 104066200 A | 9/2014 |
| CN | 107736043 A | 2/2018 |

(Continued)

OTHER PUBLICATIONS

Extended European Search Report dated Feb. 24, 2023, corresponding to European Patent Application No. 19939177.2.

(Continued)

*Primary Examiner* — Erika A Washington
(74) *Attorney, Agent, or Firm* — SQUIRE PATTON BOGGS (US) LLP

(57) ABSTRACT

Embodiments of the present disclosure relate to for controlling D2D routing. A first device generates proximity information for a D2D connection group. The first device obtains information concerning a second device in the group. The first device generates a D2D route policy for at least one application on the second device, based on the generated proximity information, the obtained information concerning the second device and route selection criteria for the group, the policy at least indicating the route selection criteria and D2D paths satisfying the route selection criteria. The first device sends the D2D route policy for routing traffic of the at least one application in the group by the second device.

18 Claims, 10 Drawing Sheets

(56) References Cited

U.S. PATENT DOCUMENTS

| | | | |
|---|---|---|---|
| 2015/0036495 A1* | 2/2015 | Venkatachalam | ............................ H04W 28/0215 370/235 |
| 2015/0188810 A1* | 7/2015 | Salkintzis | ............. H04W 40/00 370/328 |
| 2015/0382385 A1 | 12/2015 | Cai et al. | |
| 2017/0019833 A1 | 1/2017 | Luo et al. | |
| 2017/0171725 A1 | 6/2017 | Toth et al. | |
| 2017/0374611 A1 | 12/2017 | Pragada et al. | |

FOREIGN PATENT DOCUMENTS

| | | |
|---|---|---|
| CN | 108632973 A | 10/2018 |
| WO | WO 2016/191951 A1 | 12/2016 |

OTHER PUBLICATIONS

International Search Report and Written Opinion dated Apr. 15, 2020 corresponding to International Patent Application No. PCT/CN2019/097911.

Notification of the First Office Action dated Jun. 20, 2024 corresponding to Chinese Patent Application No. 2019801006326, with English translation thereof.

\* cited by examiner

METHOD, DEVICE AND COMPUTER READABLE MEDIUM FOR CONTROLLING D2D ROUTING

FIELD

Embodiments of the present disclosure generally relate to the field of telecommunication and in particular, to a method, device, apparatus and computer readable medium for controlling device-to-device (D2D) routing.

BACKGROUND

Proximity services or proximity-based services (ProSe) refer to services provided between terminal devices that are in proximity to each other. Proximity services utilize the radio technologies of the terminal devices so that the terminal devices in close proximity can communicate directly with one another without going through a core network. This kind of communications is also referred to as D2D communications.

D2D communications have been highly recognized as an efficient way to improve system performance for future wireless networks. It is widely viewed as one of key evolutionary technologies for the fifth generation (5G) communication systems. D2D communications may support a very diverse range of services including enhanced mobile broadband (eMBB), massive machine type communications (mMTC) and ultra-reliable low-latency communications (URLLC). How to route traffic of the terminal devices in D2D communications is one of key technical problems.

SUMMARY

In general, example embodiments of the present disclosure provide a solution for controlling D2D routing.

In a first aspect, there is provided a first device. The first device comprises at least one processor; and at least one memory including computer program codes; the at least one memory and the computer program codes are configured to, with the at least one processor, cause the first device to: generate proximity information for a device-to-device, D2D, connection group; obtain information concerning a second device in the group; generate a D2D route policy for at least one application on the second device, based on the generated proximity information, the obtained information concerning the second device and route selection criteria for the group, the policy at least indicating the route selection criteria and D2D paths satisfying the route selection criteria; and send the D2D route policy for routing traffic of the at least one application in the group by the second device.

In a second aspect, there is provided a second device. The second device comprises at least one processor; and at least one memory including computer program codes; the at least one memory and the computer program codes are configured to, with the at least one processor, cause the second device in a D2D connection group to: receive from a first device a D2D route policy for at least one application on the second device, the policy at least indicating route selection criteria for the group and D2D paths satisfying the route selection criteria, wherein the policy is generated based on proximity information for the group, information concerning the second device and the route selection criteria; and route traffic of the at least one application in the D2D connection group based on the policy.

In a third aspect, there is provided a method implemented at a first device. The method comprises: generating, at a first device, proximity information for a device-to-device, D2D, connection group; obtaining information concerning a second device in the group; generating a D2D route policy for at least one application on the second device, based on the generated proximity information, the obtained information concerning the second device and route selection criteria for the group, the policy at least indicating the route selection criteria and D2D paths satisfying the route selection criteria; and sending the D2D route policy for routing traffic of the at least one application in the group by the second device.

In a fourth aspect, there is provided a method implemented at a second device. The method comprises: receiving, at a second device in a D2D connection group and from a first device, a D2D route policy for at least one application on the second device, the policy at least indicating route selection criteria for the group and D2D paths satisfying the route selection criteria, wherein the policy is generated based on proximity information for the group, information concerning the second device and the route selection criteria; and routing traffic of the at least one application in the D2D connection group based on the policy.

In a fifth aspect, there is provided an apparatus comprising: means for generating, at a first device, proximity information for a D2D connection group; means for obtaining information concerning a second device in the group; means for generating a D2D route policy for at least one application on the second device, based on the generated proximity information, the obtained information concerning the second device and route selection criteria for the group, the policy at least indicating the route selection criteria and D2D paths satisfying the route selection criteria; and means for transmitting the D2D route policy to the second device for routing traffic of the at least one application in the group.

In an sixth aspect, there is provided an apparatus comprising: means for receiving, at a second device in a D2D connection group and from a first device, a D2D route policy for at least one application on the second device, the policy at least indicating route selection criteria for the group and D2D paths satisfying the route selection criteria; and means for routing traffic of the at least one application in the D2D connection group based on the policy.

In a seventh aspect, there is provided a computer readable medium comprising a computer program for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
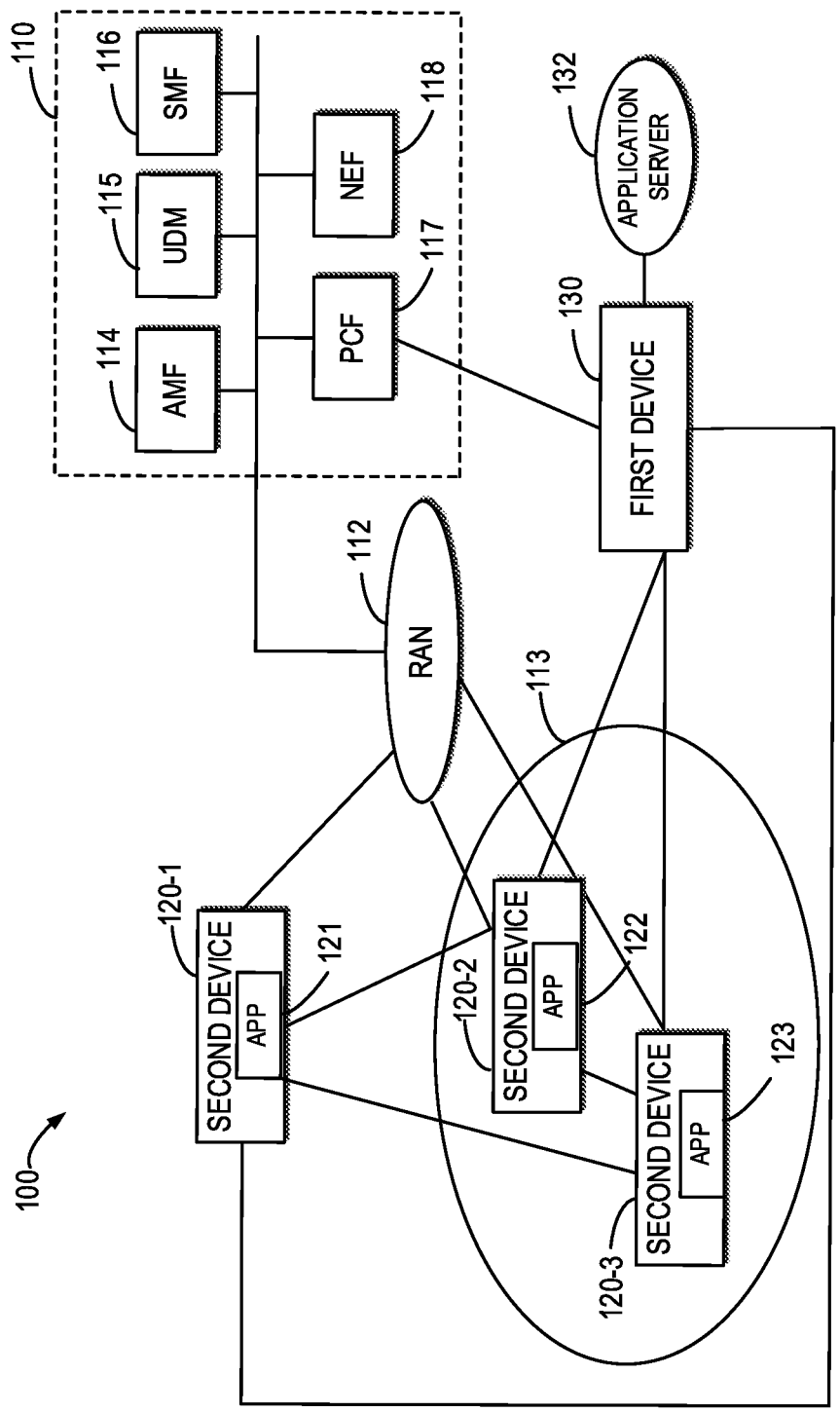
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a core network 110 that communicates with second devices 120-1, 120-2 and 120-3 over a Radio Access Network (RAN) 112. The second devices 120-1, 120-2 and 120-3 are collectively referred to as second device(s) 120. Although not shown in FIG. 1, the RAN 112 includes a plurality of network devices that provide wireless connections between second devices 120 and the core network 110. The plurality of network devices provide respective coverage areas which are referred to as cells. For example, the cells may include a cell 113 as shown in FIG. 1. In the example of FIG. 1, the second device 120-1 is shown to be outside the cell 113, the second devices 120-2 and 120-3 are shown to be within the cell 113.

The core network 110 may include an Access and Mobility Management Function (AMF) device 114, a Unified Data Management (UDM) device 115, a Session Management Function (SMF) device 116, a Policy Control Function (PCF) device 117 and a Network Exposure Function (NEF) device 118.

The AMF device 114 is configured to manage and control access rights and handover of terminal devices. The UDM device 115 is configured to provide a database to support storage of information concerning the second devices 120. The SMF device 116 is configured to provide a session management function, service continuity, uninterrupted user experience for services. The PCF device 117 is configured to specify policies that are used in the network 100. The NEF device 118 is configured to expose functions and events to outside.

The network 100 further includes a first device 130 and an application server 132.

The first device 130 is configured to provide a ProSe function that is used for network-related actions required for ProSe. ProSe may include discovery, direct communication (also referred to as D2D communication), and UE-to-network relay. Discovery is a procedure that identifies terminal devices that are in proximity with each other. Direct communication is a procedure where terminal devices in proximity are able to communicate using local radio resources. UE-to-network relay is a procedure where a terminal device can relay traffic from a remote terminal device to a network device, or from the network device to the remote terminal device. For example, if a remote terminal device (for example, the second device 120-1) is outside the coverage area 113 of a network device, then the UE-to-network relay procedure allows the remote terminal device to transmit traffic to a relay terminal device (for example, the second device 120-2) that is in the coverage area 113 of the network device through a direct communication with the relay terminal device. The relay terminal device in turn forwards the traffic from the remote terminal device to the network device by communicating with the network device.

The application server 132 is configured to control or require the first device 130 to provide the ProSe function. In some example embodiments, the application server 132 may support storage of EPC ProSe User IDs and ProSe function IDs, and mapping of Application Layer User IDs and EPC ProSe User IDs.

The second devices 120 are configured to be ProSe-enabled (also referred to as D2D-enabled), meaning that they support ProSe requirements and associated procedures. As such, in the context of the present disclosure, the second devices are also referred to D2D devices. Each of the second devices 120 may include one or more applications. For example, in the example of FIG. 1, the second devices 120 include applications 121, 122 and 123, respectively. The applications 121, 122 and 123 may be used to access and/or provide proximity services.

In some example embodiments, the second devices 120 may be configured to support the following functions: exchange of ProSe control information between the second devices 120 and the first device 130 over a PC3 interface, procedures for open and restricted direct discovery of other devices over a PC5 interface, procedures for one-to-one or one-to-many direct communication over the PC5 interface, and procedures to act as a UE-to-network relay.

It is to be understood that the numbers of network elements in the core network 110, the first device and second devices are only for the purpose of illustration without suggesting any limitations. The network 100 may include any suitable number of network elements, the first device and second devices adapted for implementing embodiments of the present disclosure.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As mentioned above, how to route traffic of the terminal devices in D2D communications is one of key technical problems. However, conventional D2D communications are only based on the view of D2D UE itself. It's far from good enough and would cause many problems. Specifically, the advantage/benefit of D2D connections cannot be fully used. For example, the D2D connection created by one application cannot be used by another application. This is a big waste in D2D communications. Because there is no global view of D2D connections in a network, it's impossible to build a D2D connection path (e.g. UE-to-Network relay path) or service chain. The traffic routing is static and inefficient, and lacks dynamic routing based on real needs of applications and dynamic network conditions. There is a lack of dynamic routing controlling on traffic of terminal devices with the consideration of D2D connections.

In order to at least in part solve above and other potential problems, example embodiments of the present disclosure provide a solution for controlling D2D routing. In the solution, a D2D connection group is created. The D2D connection group comprises a plurality of D2D devices that are allowed to establish D2D connections between them. A first device generates a D2D route policy for at least one application on a D2D-enabled device in the group, based on proximity information for the D2D connection group, information concerning the D2D device and route selection criteria for the group. The policy at least indicates the route selection criteria and D2D paths satisfying the route selection criteria. The first device provisions the D2D route policy to the D2D device so that the D2D device routes traffic of the at least one application in the D2D connection group based on the policy. With this solution, the network may have a global view to control all D2D paths in the group. Thus, it is possible to take fully advantage of all D2D paths to route traffic. Accordingly, efficiency of the network may be improved.

Figure 2:
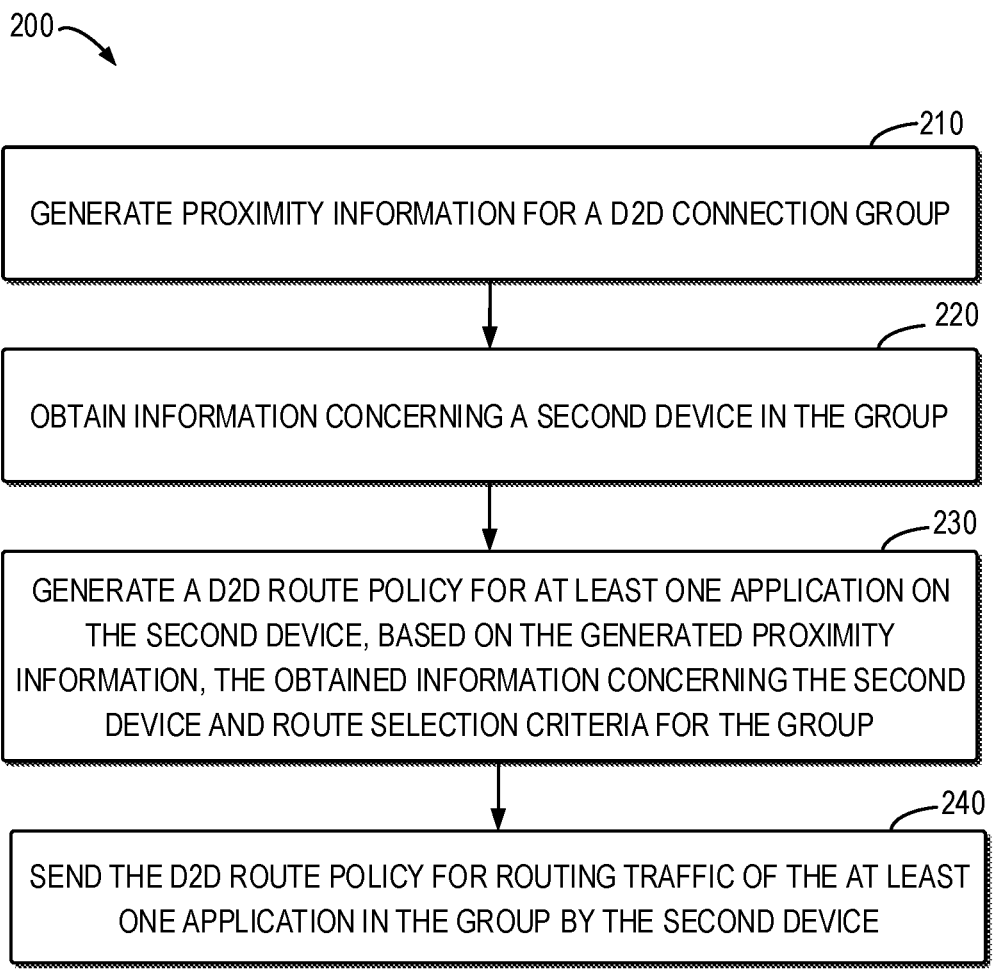
FIG. 2 shows a flowchart of a method implemented at a first device in accordance with some example embodiments of the present disclosure.

Principle and implementations of the present disclosure will be described in detail below with reference to FIGS. 2 to 8. FIG. 2 shows a flowchart of an example method 200 implemented at a device in accordance with some example embodiments of the present disclosure. For the purpose of discussion, the method 200 will be described from the perspective of the first device 130 with reference to FIG. 1.

At block 210, the first device 130 generates proximity information for a D2D connection group. The D2D connection group comprises a plurality of D2D devices that are allowed to establish D2D connections between them. In the example of FIG. 1, the D2D connection group may comprise part or all of the second devices 120. In some example embodiments, the second devices 120 may be terminal devices. Examples of the second devices 120 may include, but are not limited to, UEs, IoT devices (such as surveillance camera, smart lights and the like). In some example embodiments, the D2D connection group may be created by a manager or provider of the second devices 120. For example, the D2D connection group may be created as the D2D connection group={D2D device #1, D2D device #2, D2D device #3, . . . }.

In some example embodiments, the proximity information for the D2D connection group may indicate whether the second devices 120 are in proximity to each other. In some example embodiments, the proximity information for the D2D connection group may further indicate whether there is one or more D2D paths among the second devices 120.

Figure 3:
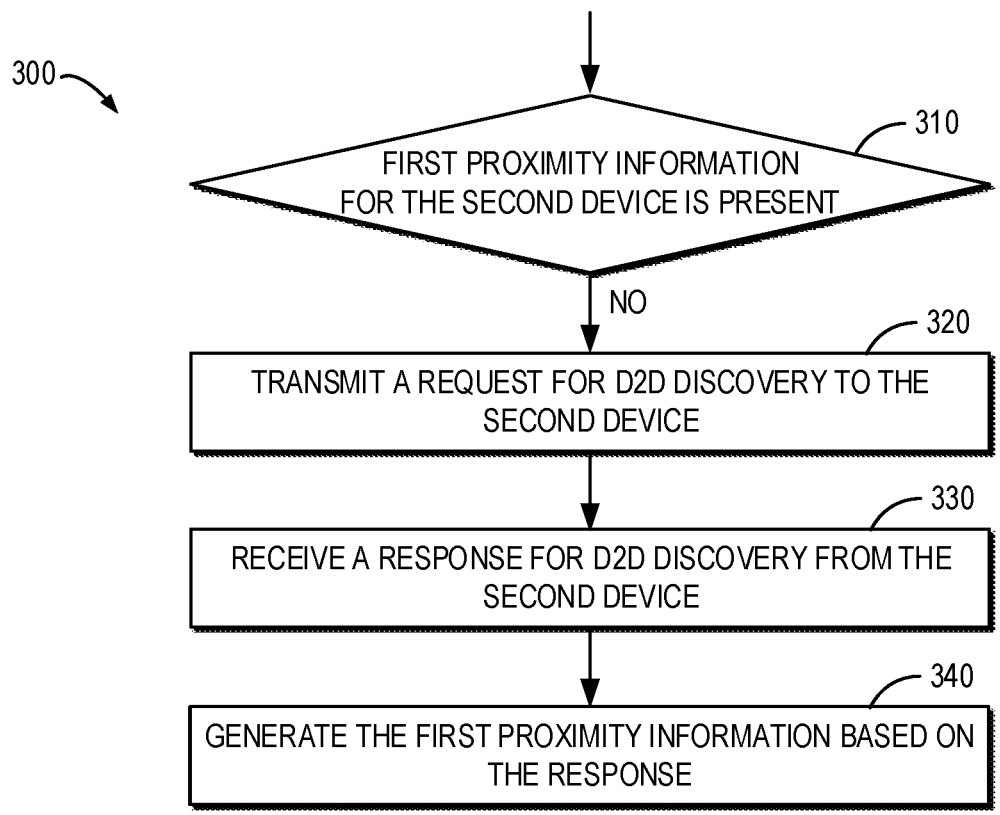
FIG. 3 shows a flowchart of a process for generating proximity information for a D2D connection group in accordance with some embodiments of the present disclosure.

Reference is now made to FIG. 3, which shows a flowchart of a process 300 for generating proximity information for a D2D connection group in accordance with some embodiments of the present disclosure. For the purpose of discussion, the process 300 will be described from the perspective of the first device 130 with reference to FIG. 1.

At block 310, the first device 130 determines whether first proximity information for one of the second devices 120 (for example, the second device 120-1) is present.

As mentioned above, the first device 130 is configured to provide the ProSe function, and the ProSe may include direct discovery (also referred to as D2D discovery). If the second device 120-1 has previously performed a D2D discovery procedure, the first device 130 would have retrieved the first proximity information from a response to a D2D discovery request. In turn, the first device 130 may store the first proximity information for the second device 120-1 in a local storage of the first device 130. Thus, the first device 130 may check its local storage to determine whether the first proximity information for the second device 120-1 is present.

If the first proximity information for the second device 120-1 is not present, that is, the first proximity information is absent, the first device 130 transmits a request for D2D discovery to the second device 120-1 at block 320.

At block 330, the first device 130 receives a response for D2D discovery from the second device 120-1. At block 340, the first device 130 retrieves the first proximity information from the response so as to generate the first proximity information based on.

On the other hand, if the first device 130 determines at block 310 that the first proximity information for the second device 120-1 is present, the first device 130 may perform the method 300 with respect to other D2D devices in the D2D connection group to generate their respective proximity information. For example, in the example embodiments where the D2D connection group comprises all of the second devices 120-1, 120-2 and 120-3, the method 300 may be performed with respect to each of the second devices 120-1, 120-2 and 120-3.

Upon generating the proximity information for all of D2D devices in the D2D connection group, the first device 130 may generate the proximity information for the D2D connection group by combining the proximity information for all of the D2D devices in the group.

In the process 300, if proximity information for a D2D device is present, the D2D discovery procedure will not be triggered with respect to this D2D device. Thus, unnecessary D2D discovery is reduced as more as possible.

In some example embodiments, if statuses of one or more D2D devices in the D2D connection group change, the first device 130 may update the proximity information for the D2D connection group based on the changed statuses. In turn, the first device 130 may update the D2D route policy based on the updated proximity information. In this way, dynamic routing controlling of traffic is achieved and traffic routing on D2D paths can be switched on/off dynamically based on real needs of an application or network condition change.

Figure 4:
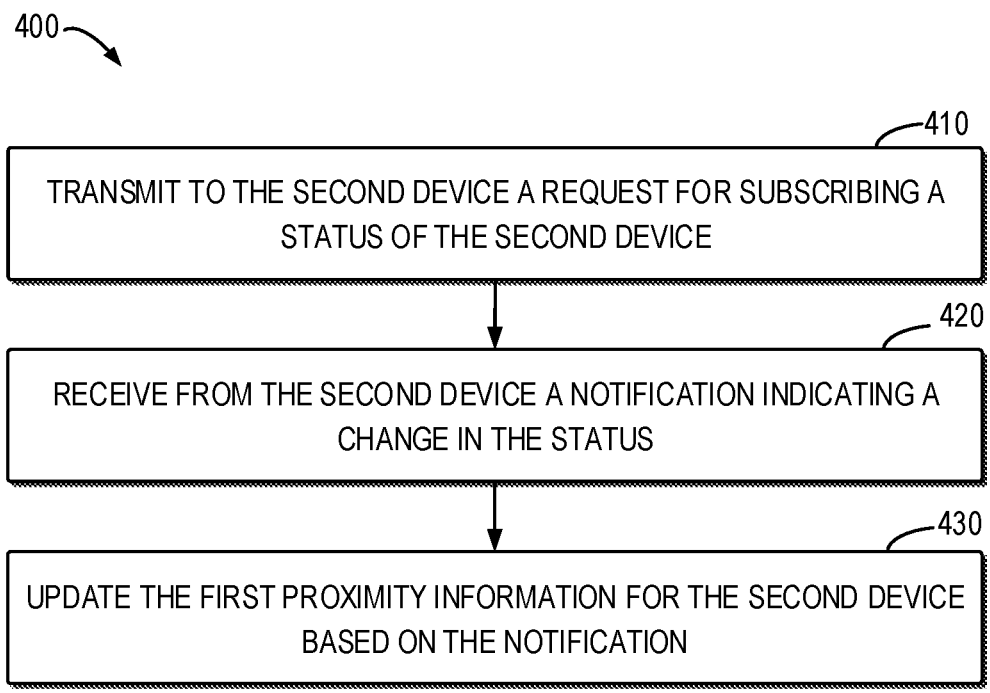
FIG. 4 shows a flowchart of a process for updating proximity information for a D2D connection group in accordance with some embodiments of the present disclosure.

FIG. 4 shows a flowchart of a process 400 for updating proximity information for a D2D connection group in accordance with some embodiments of the present disclosure. For the purpose of discussion, the process 400 will be described by taking the second device 120-1 for example.

At block 410, the first device 130 transmits to the second device 120-1 a request for subscribing a status of the second device 120-1. If there is a change in the status of the second device 120-1, the second device 120-1 may transmit to the first device 130 a notification indicating the change in the status. Accordingly, at block 420, the first device 130 receives the notification from the second device 120-1. At block 430, the first device updates the first proximity information for the second device 120-1 based on the notification.

In some example embodiments, when the D2D connection group is created, the first device 130 may transmit to the second device 120-1 the request for subscribing the status of the second device 120-1.

In some example embodiments, the status of a D2D device indicates at least one of the following: statuses of D2D paths in the D2D route policy, statuses of traffic on the D2D paths, and an execution status of the D2D route policy.

Referring back to FIG. 2, at block 220, the first device 130 obtains information concerning a D2D device in the group. For example, in the example embodiments where the D2D connection group comprises the second device 120-1, the first device 130 may obtain information concerning the second device 120-1 in the group.

In some example embodiments, the information concerning the D2D device comprises at least one of the following: capability information concerning the D2D device, indication concerning at least one D2D connection group to which the D2D device belongs, accounting information concerning the D2D device, a payment policy for the D2D device, usage of hardware resources on the D2D device, information concerning traffic on the D2D device, and information concerning the at least one application.

In some example embodiments, the capability information concerning the D2D device may indicate hardware related capability of the D2D device and dynamic information of the D2D device. For example, the hardware related capability of the D2D device may comprise information concerning CPU, memory, network bandwidth of the D2D device. For example, the dynamic information of the D2D device may comprise working load, power information, location information and the like.

In some example embodiments, the capability information concerning the D2D device may be obtained from other network elements, such as the UDM device 115, the PCF device 117. The accounting information may be obtained from the UDM device 115.

Usage of hardware resources (such as CPU) on the D2D device and information concerning traffic on the D2D device may be obtained from the PCF device 117 or the D2D device itself. If the D2D device has full task (e.g. CPU usage or real time traffic is beyond a threshold), the first device 130 will not use the D2D device for heavy traffic routing. If CPU usage keeps increasing beyond a threshold, the first device 130 will trigger update of D2D route policy accordingly.

In some example embodiments, a D2D device may belong to one or more D2D connection groups. The indication concerning the one or more D2D connection groups to which the D2D device belongs may comprise identifiers of the one or more D2D connection groups. If a D2D device belongs to one D2D connection group, it means the D2D device can connect to any other D2D devices in this group through D2D communication.

In some example embodiments, the information concerning the at least one application comprises at least one of the following: identifier (ID) of the at least one application which indicates the at least one application uniquely, Quality of Service (QoS) parameters for traffic of the at least one application, and security requirements associated with the at least one application.

In some example embodiments, the QoS parameters may comprise bandwidth, data throughput, latency, data error rate, and so on. In some example embodiments, security requirements associated with an application indicate the security level that traffic of the application will apply. For example, an application handling sensitive information may require specific encryption in D2D routing, or it may require D2D communication with a specific D2D connection group.

In some example embodiments, accounting information concerning the D2D device and a payment policy for the D2D device allow the network to decide the payback rate if the D2D device act as a role in UE-to-network relay. The Payback rate for the D2D device will depend on many charging factors, such as capacity of the D2D device, current usage rate, royalty, etc. The Network and D2D device mutually will select an efficient way for a D2D routing based on economic benefits.

Upon obtaining the information concerning the D2D device, the first device 130 may create a D2D profile for the D2D device based on the obtained information.

Referring back to FIG. 2, at block 230, the first device 130 generates a D2D route policy for at least one application on the second device 120-1, based on the generated proximity information for the group, the obtained information concerning the second device 120-1 and route selection criteria for the group. The D2D route policy at least indicates the route selection criteria and D2D paths satisfying the route selection criteria.

In some example embodiments, the first device 130 may generate the policy in response to receiving a request for generating the D2D route policy from one of the following: the application server 132, the PCF device 117, a network device serving the second device 120-1, and the second device 120-1. For example, the application server 132 may be a server managing the Wechat application, and the request for generating the D2D route policy may be received from the application server 132. The request may be a request for connecting the second device 120-1 and 120-2 directly for video sharing.

In some example embodiments, the first device 130 may obtain the route selection criteria from the application server 132 or the PCF device 117. Alternatively, the route selection criteria may be pre-configured. For example, the route selection criteria may be pre-configured by a provider of the first device 130.

In some example embodiments, the route selection criteria may indicate types of traffic of at least one application and route selection requirements for routing the types of traffic. Examples of the route selection requirements may include, but are not limited to, QoS parameters for traffic, and security requirements associated with the at least one application. Table 1 shows an example of the route selection criteria. It should be noted that the contents in Table 1 are only examples.

TABLE 1

| Application ID | Traffic type | QoS parameters | Note |
|---|---|---|---|
| | Traffic type = Video | Bandwidth > 1M | A D2D path having a bandwidth above 1M shall be used for routing the video traffic of the Application #1. |
| | Traffic type = Message | Bandwidth > 1k | A D2D path having a bandwidth above 1k shall be used for routing the message traffic of the Application #1. |

In the present disclosure, the D2D route policy at least indicates the route selection criteria and D2D paths satisfying the route selection criteria. In some example embodiments, the D2D route policy may include a set of route rules for the at least one application. In some example embodiments, the D2D route policy may include more than one route rules for an application. For example, the D2D route policy may include a first route rule and a second route rule for Application #1. The first route rule indicates a first route selection criterion and a first D2D path. The second route rule indicates a second route selection criterion and a second D2D path. In such embodiments, the first device 130 may assign priorities to the first and second route rules. The priorities indicate an order in which the first and second route rules are to be performed by the second device. Table 2 shows an example of route rules in a D2D route policy. It should be noted that the contents in Table 2 are only examples.

In the example of Table 2, because the Rule #1 is assigned with a high priority, the second device should follow the Rule #1 to route the traffic of the Application #1.

In some example embodiments, in addition to the action of routing, the policy may further indicates actions associated with the at least one application. In some example embodiments, the actions comprise at least one of the following: security check, encryption, data translation, and creation of new D2D communication.

Figure 5:
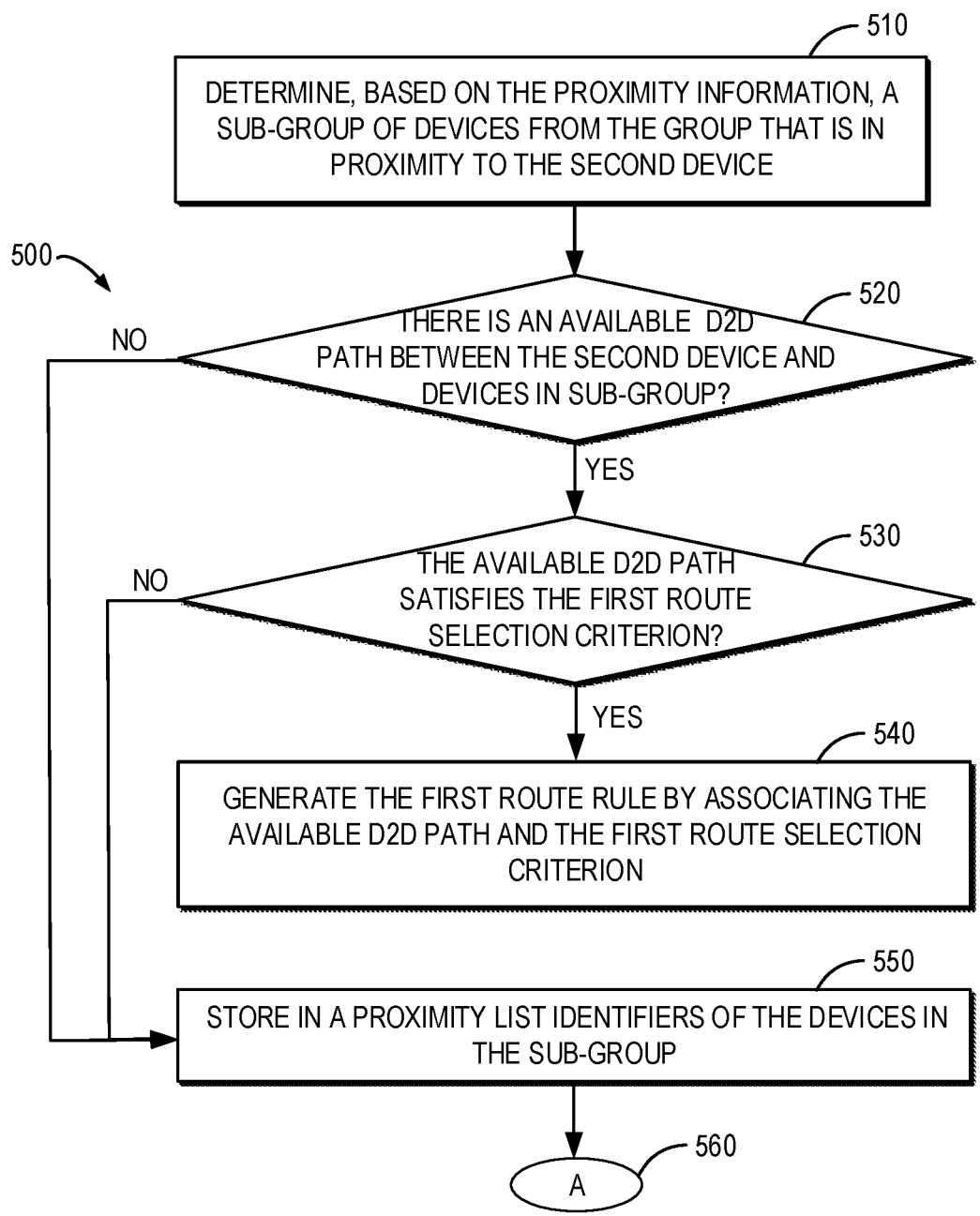
FIG. 5 shows a flowchart of a process for generating a route rule in a D2D route policy in accordance with some embodiments of the present disclosure.

Reference is now made to FIG. 5, which shows a flow-chart of a process 500 for generating a route rule in a D2D route policy in accordance with some embodiments of the present disclosure. For the purpose of discussion, the process 500 will be described with reference to FIG. 1 and by taking generation of the first route rule for Application #1 for example.

At block 510, the first device 130 determines a sub-group of devices from the D2D connection group based on the proximity information for the D2D connection group. The devices in the sub-group are in proximity to the second device (for example, the second device 120-1 in FIG. 1). In some example embodiments, the first device 130 may determine the sub-group of devices based both on the proximity information and on capabilities of the devices in the D2D connection group.

At block 520, the first device 130 determines whether there is an available path between the second device 120-1 and the devices in the sub-group.

If there is the available D2D path, the first device 130 determines whether the available D2D path satisfies the first route selection criterion at block 530.

If the available D2D path satisfies the first route selection criterion, the first device 130 generates the first route rule by associating the available D2D path and the first route selection criterion at block 540.

TABLE 2

| Application ID | Rule ID | Priority | Traffic type | QoS parameters | D2D path | Action |
|---|---|---|---|---|---|---|
| #1 | #1 | High | Traffic type = Video | Bandwidth > 1M | Path #1 (e.g., from the second device 120-1 to the second device 120-2 in FIG. 1) | Route video traffic of the Application #1 via Path #1. |
| | | | Traffic type = Message | Bandwidth > 1k | Path #2 (e.g., from the second device 120-1 to the second device 120-3 in FIG. 1) | Route message traffic of the Application #1 via Path #2. |
| | #2 | Low | Traffic type = Video | Bandwidth > 1M | Path #3 | Route video traffic of the Application #1 via Path #3. |
| | | | Traffic type = Message | Bandwidth > 1k | Path #4 | Route message traffic of the Application #1 via Path #4. |

On the other hand, if the first device 130 determines at block 520 there is no available D2D path or determines at block 530 the available D2D path does not satisfy the first route selection criterion, the first device 130 stores IDs of the devices in the sub-group in a proximity list at block 550. In turn, the process 500 proceeds to block 560 to generate the first D2D path in the first route rule, which will be described below with reference to FIG. 6.

As discussed above, the second device may belong to more than one D2D connection groups. In this case, the process 500 may be performed with respect to all of the D2D connection groups to which the second device belongs.

Figure 6:
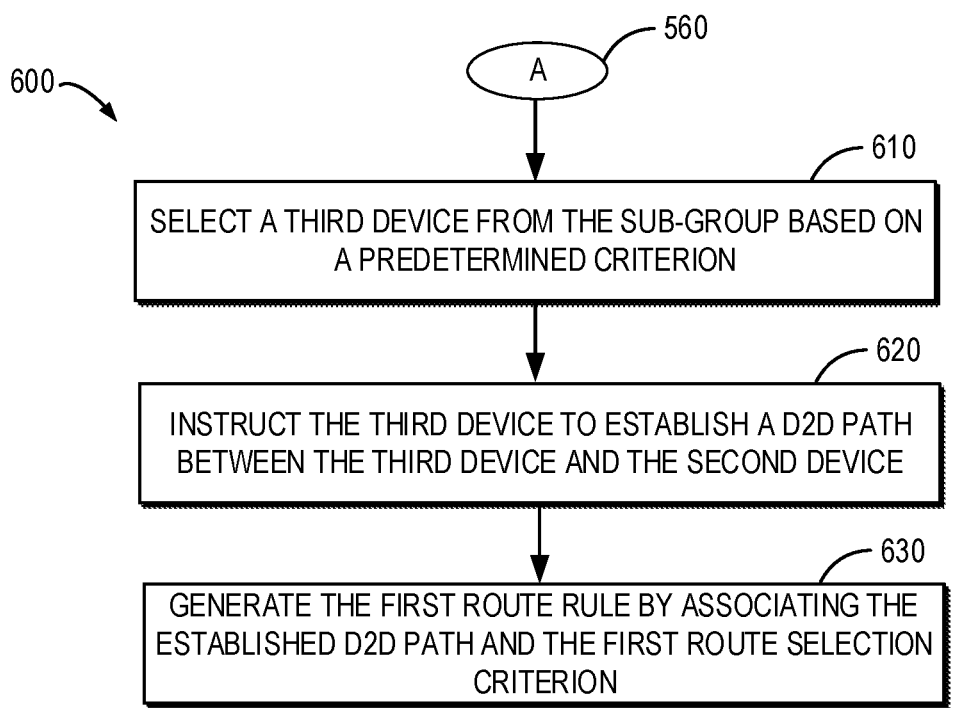
FIG. 6 shows a flowchart of a process for generating a route rule in a D2D route policy in accordance with some other embodiments of the present disclosure.

FIG. 6 shows a flowchart of a process 600 for generating a route rule in a D2D route policy in accordance with some other embodiments of the present disclosure. For the purpose of discussion, the process 600 will be described with reference to FIG. 1 and by taking generation of the first D2D path in the first route rule for example.

At block 610, the first device 130 selects a device (also referred to as a third device) from the sub-group based on a predetermined criterion. In some example embodiments, the predetermined criterion comprises at least one of the following: priorities indicating an order in which the devices in the sub-group are to be selected, capabilities of the devices in the sub-group, capacity of a RAN that the devices in the sub-group access, and working loads of the devices in the sub-group. For example, capabilities of the devices may include performance of CPU or storage, power, software, proximity to other D2D devices in the group.

At block 620, the first device 130 instructs the third device to establish the first D2D path between the third device and the second device.

At block 630, the first device 130 generates the first route rule by associating the established D2D path and the first route selection criterion.

Referring back to FIG. 5, if the first device 130 determines at block 530 that the available D2D path satisfies the first route selection criterion, the first device 130 may further determine whether there is an available route rule (referred to as a second route rule) for the at least one application and generate the first route rule based on the determination, which will be described below with reference to FIG. 7.

Figure 7:
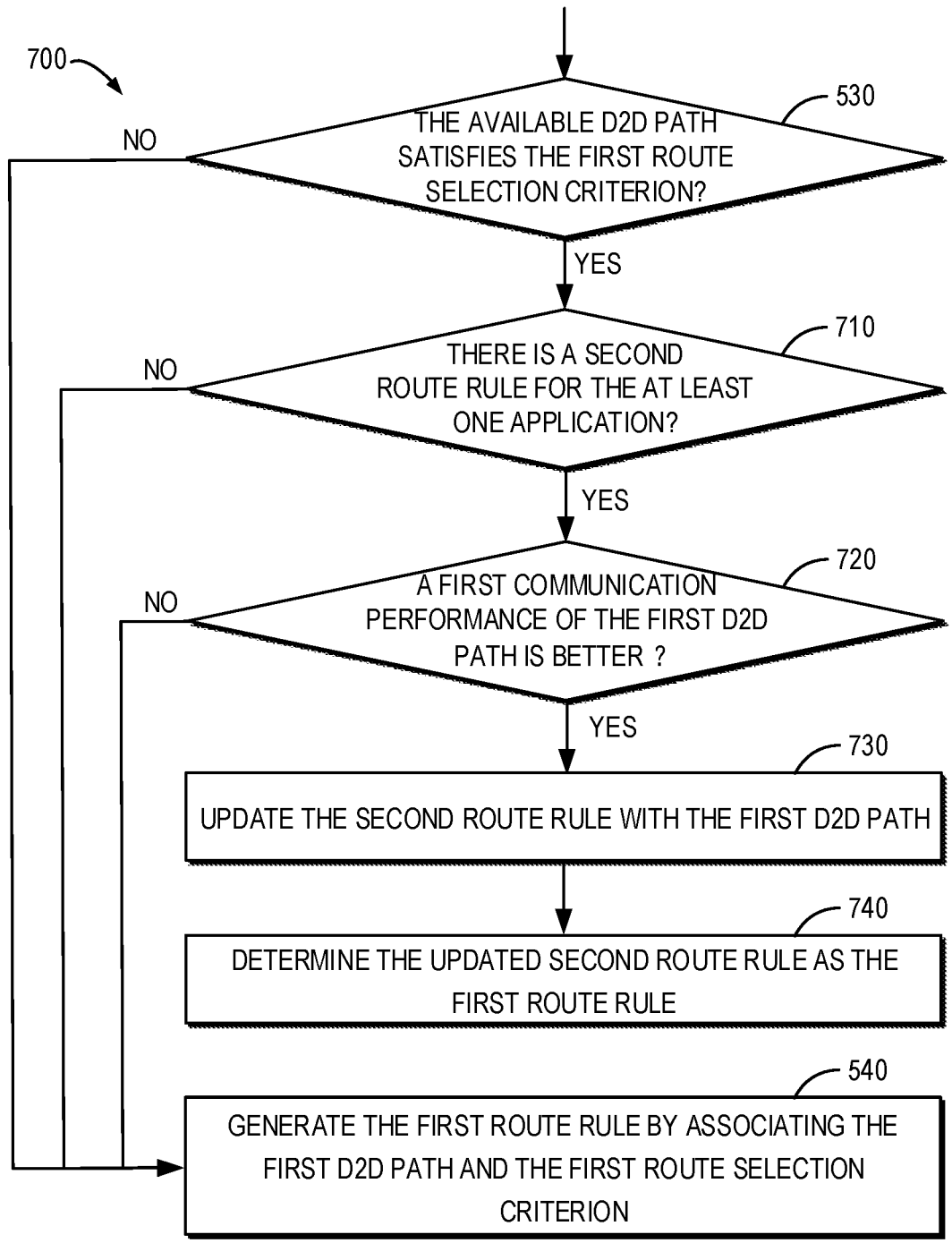
FIG. 7 shows a flowchart of a process for generating a route rule in a D2D route policy in accordance with still other embodiments of the present disclosure.

FIG. 7 shows a flowchart of a process 700 for generating a route rule in a D2D route policy in accordance with still other embodiments of the present disclosure. For the purpose of discussion, the process 700 will be described with reference to FIG. 1 and by taking generation of the first route rule for example. Actions at blocks 530 and 540 in the process 700 are the same as those at blocks 530 and 540 in the process 500. Thus, the descriptions of these actions are omitted for conciseness.

At block 710, the first device 130 determines whether there is an available route rule (referred to as a second route rule) for the at least one application. The second route rule indicates the first route selection criterion and a second D2D path. The second D2D path is different from the first D2D path in the first route rule.

If there is the second route rule, the first device 130 determines at block 720 whether a first communication performance of the first D2D path is better than a second communication performance of the second D2D path. Examples of the communication performance may include, but are not limited to, bandwidth, data throughput, latency, data error rate.

If the first communication performance is better than the second communication performance, the first device 130 updates the second route rule with the first D2D path at block 730.

At block 740, the first device 130 determines the updated second route rule as the first route rule.

If it is determined at block 530 that the available D2D path does not satisfy the first route selection criterion or it is determined at block 710 that there is no the second route rule, or it is determined at block 720 that the first communication performance of the first D2D path is not better than the second communication performance of the second D2D path, the process 700 proceeds to block 540.

Referring back to FIG. 2, at block 240, the first device 130 sends the D2D route policy for routing traffic of the at least one application in the group by the second device 120-1.

In some example embodiments, the first device 130 may send the D2D route policy to the second device 120-1 through a network element. For example, the first device 130 may send the D2D route policy to the second device 120-1 through the PCF device 117 to the second device 120-1 as part of UE Route Selection Policy (URSP). In this way, the URSP may be enhanced with the D2D routing policy.

The URSP is proposed in 5G standards to determine how to route UE outgoing traffic to meet above requirements. According to 3GPP specifications, the URSP is generated by a PCF device (such as the PCF device 117 in FIG. 1) in a core network and provisioned on a terminal device. Base on the URSP, the terminal device can determine whether traffic of an application can be associated with an established packet data unit (PDU) Session, can be offloaded to non-3GPP access outside the PDU Session, or can trigger an establishment of a new PDU Session.

In some other example embodiments, the first device 130 may send directly to the second device 120-1 the D2D route policy via a D2D PC3 interface.

In some other example embodiments, the D2D route policy further indicates actions associated with the at least one application. Examples of the actions may include, but are not limited to, security check, encryption, data translation, and creation of new D2D communication.

Figure 8A:
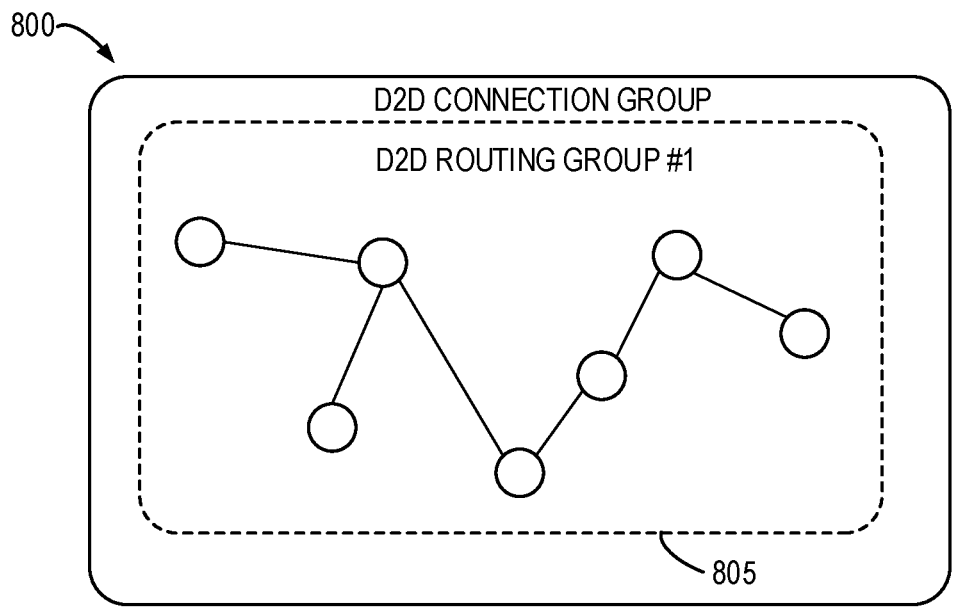
FIG. 8A shows a schematic diagram of a D2D connection group with one D2D routing group in accordance with some embodiments of the present disclosure.
Figure 8B:
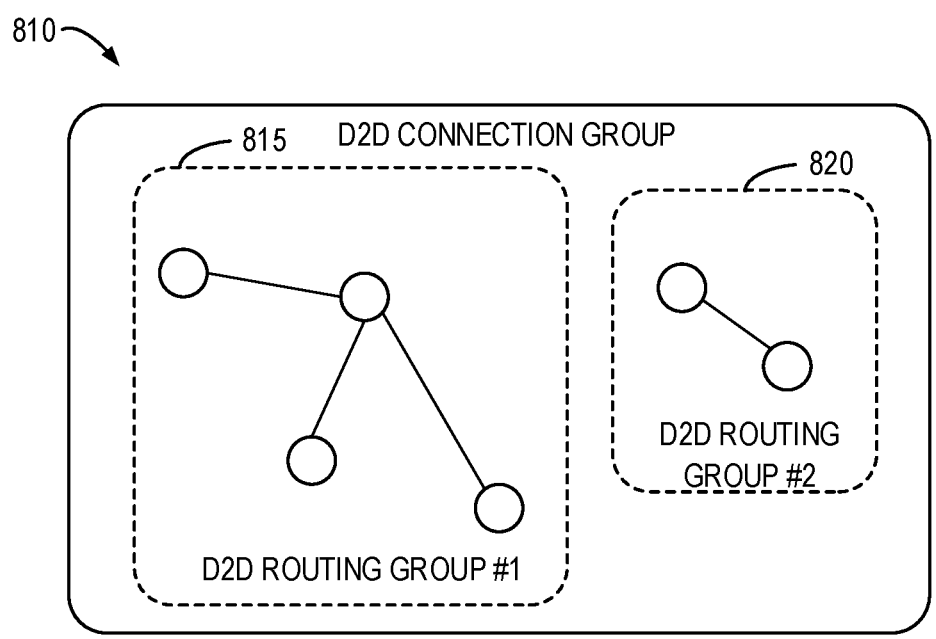
FIG. 8B shows a schematic diagram of a D2D connection group with two D2D routing groups in accordance with some embodiments of the present disclosure.

In some example embodiments, the first device 130 may establish D2D paths for all of the D2D devices in a D2D connection group so as to generate one or more D2D routing groups. FIG. 8A shows a schematic diagram of a D2D connection group 800 with one D2D routing group 805 in accordance with some embodiments of the present disclosure. FIG. 8B shows a schematic diagram of a D2D connection group 810 with D2D routing group 815 and 820 in accordance with some embodiments of the present disclosure.

Once multiple D2D routing groups are generated in one D2D connection group, the first device 130 will check if it's possible to combine multiple D2D routing groups into one routing group.

If there is no shared D2D device between two D2D routing groups, i.e. the two D2D routing groups are not in proximity to each other, multiple D2D routing groups in one D2D connection group will be kept. Alternatively, if the shared D2D device does not satisfy the criteria of a relay UE, multiple D2D routing groups in one D2D connection group will be kept.

One use case of the present disclosure will now be described with reference to FIG. 1. In this use case, dynamic UE-to-Network relay traffic routing path will be established for a D2D connection group which comprises the second devices 120-1, 120-2 and 120-3. For example, the second devices 120-1, 120-2 and 120-3 may be IoT devices. It is assumed that the second device 120-2 has a packet data network (PDN) connection for relaying. From the view of radio resource saving and communication cost saving, the first device 130 may instruct other IoT devices in the D2D connection group to route their traffic to the RAN 112 through a relay UE, that is, the second device 120-2.

The routing of UE-to-Network Relay may be changed dynamically based on the network condition change because of the scaling of the D2D connection group. For example, once the QoS parameters of the UE-to-Network relaying PDN connection of the relay UE 120-2 cannot satisfy the needs of other IoT devices in the group, the first device 130 may take actions comprising one of the following:

Update the QoS parameters of the PDN connection of the relay UE 120-2;

Instruct the relay UE 120-2 to create another UE-to-Network relaying PDN connection; and Instruct related IoT devices to route their traffic through another UE-to-Network relay UE, for example, the second device 120-3.

In some scenarios, the UE-to-Network relay path may include multiple hops. That is, before the traffic has been routed to the network, it has been relayed through more than one D2D devices. For example, if UE #X cannot be connected to a Relay UE, for example, UE #1 directly, the network may instruct UE #X to route its traffic through other UEs. Therefore, the UE-to-Network relay path may look like below: UE #X→UE #Y→UE #Z→UE #1→Network.

Above is just one use case of network controlled routing selection on D2D communication proposed by the present disclosure. The present disclosure can be widely used in IoT scenarios, such as street lights communication, communication of city surveillance equipment, Vehicle to Everything (V2X) communication, and so on . . . .

Figure 9:
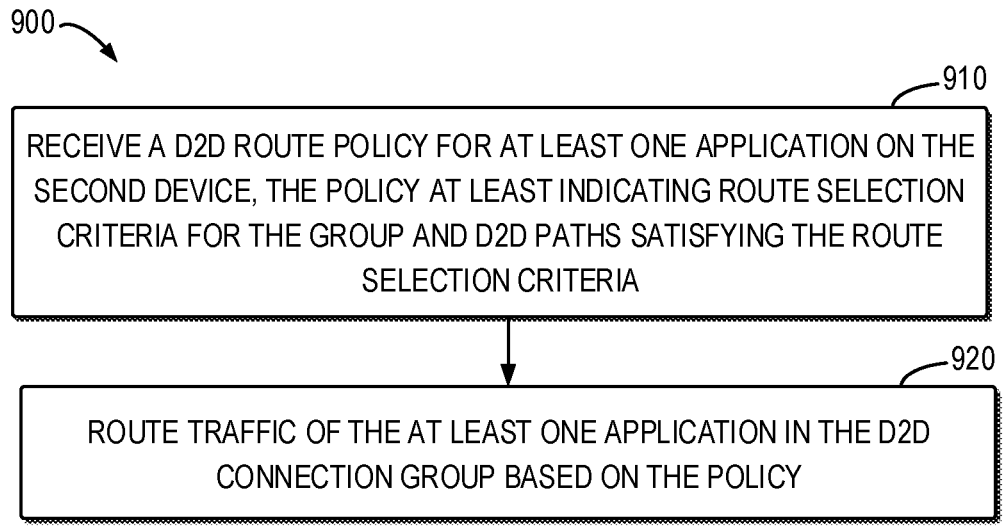
FIG. 9 shows a flowchart of a method implemented at a second device in accordance with some example embodiments of the present disclosure.

FIG. 9 shows a flowchart of an example method 900 implemented at a device in accordance with some example embodiments of the present disclosure. For the purpose of discussion, the method 900 will be described from the perspective of the second device with reference to FIG. 1.

At block 910, the second device 120 receives a D2D route policy for at least one application on the second device. The policy at least indicates route selection criteria for the group and D2D paths satisfying the route selection criteria. The policy is generated based on proximity information for the group, information concerning the second device and the route selection criteria.

In some example embodiments, the second device 120 receives the D2D route policy from the first device 130 directly.

In some example embodiments, the second device 120 receives the D2D route policy from other network element. For example, the second device 120 may receive the D2D route policy from the PCF device 117 as part of UE Route Selection Policy (URSP).

At block 920, the second device 120 routes traffic of the at least one application in the D2D connection group based on the policy.

In some example embodiments, the second device 120 receives a request for subscribing a status of the second device from the first device 130. If there is a change in the status, the second device 120 transmits to the first device 130 a notification indicating the change.

In some example embodiments, the status of the second device 120 indicates at least one of the following: statuses of the D2D paths, statuses of traffic on the D2D paths, and an execution status of the policy.

In some example embodiments, the policy comprises a first route rule for the at least one application and a second route rule for the at least one application, the first and third route rules being assigned with priorities, the priorities indicating an order in which the first and second rules are to be performed by the second device.

In some example embodiments, the second device 120 selects one of the first and second route rules based on the priorities and routes the traffic based on the selected route rule.

It shall be appreciated that descriptions of features with reference to FIGS. 2 to 8 also apply to the method 900, and have the same effects. Thus, the details of the features are omitted.

In some example embodiments, an apparatus capable of performing any of the method 200 (for example, the first device 130) may comprise means for performing the respective steps of the method 200. The means may be implemented in any suitable form. For example, the means may be implemented in a circuitry or software module.

In some example embodiments, the apparatus comprises: means for generating, at a first device, proximity information for a D2D connection group; means for obtaining information concerning a second device in the group; means for generating a D2D route policy for at least one application on the second device, based on the generated proximity information, the obtained information concerning the second device and route selection criteria for the group, the policy at least indicating the route selection criteria and D2D paths satisfying the route selection criteria; and means for sending the D2D route policy for routing traffic of the at least one application in the group by the second device.

In some example embodiments, means for generating the proximity information comprises: means for determining whether first proximity information for the second device is present; means for in response to a determination that the first proximity information is absent, transmitting a request for D2D discovery to the second device; means for receiving a response for D2D discovery from the second device; and means for generating the first proximity information based on the response.

In some example embodiments, the apparatus further comprises: means for transmitting to the second device a request for subscribing a status of the second device; means for receiving from the second device a notification indicating a change in the status; and means for updating the first proximity information for the second device based on the notification.

In some example embodiments, the apparatus further comprises: means for updating the policy based on the updated first proximity information.

In some example embodiments, the status of the second device indicates at least one of the following: statuses of the D2D paths, statuses of traffic on the D2D paths, and an execution status of the policy.

In some example embodiments, means for generating the proximity information comprises: means for generating a first route rule for the at least one application, the first route rule indicating a first route selection criterion among the route selection criteria and a first D2D path among the D2D paths.

In some example embodiments, means for generating the proximity information comprises: means for determining, based on the proximity information, a sub-group of devices from the group that is in proximity to the second device; means for determining whether there is an available D2D path between the second device and the devices in the sub-group; means for in response to a determination that there is the available D2D path, determining whether the available D2D path satisfies the first route selection criterion; and means for in response to a determination that the first D2D path satisfies the first route selection criterion, generating the first route rule by associating the available D2D path and the first route selection criterion.

In some example embodiments, means for generating the first route rule comprises: means for in response to the determination that the available D2D path satisfies the first route selection criterion, determining whether there is a second route rule for the at least one application, the second route rule indicating the first route selection criterion and a second D2D path, the second D2D path different from the available D2D path; means for in response to a determination that there is the second route rule, determining whether a first communication performance of the available D2D path is better than a second communication performance of the second D2D path; means for in response to the determination that the first communication performance is better than the second communication performance, updating the second route rule with the available D2D path; and means for determining the updated second route rule as the first route rule.

In some example embodiments, means for generating the first route rule further comprises: in response to a determination that the available D2D path is absent, means for storing in a proximity list identifiers of the devices in the sub-group.

In some example embodiments, means for generating the first route rule further comprises: means for selecting a third device from the sub-group based on a predetermined criterion; means for instructing the third device to establish a D2D path between the third device and the second device; and means for generating the first route rule by associating the establish D2D path and the first route selection criterion.

In some example embodiments, the predetermined criterion comprises at least one of the following: priorities indicating an order in which the devices in the sub-group are to be selected, capabilities of the devices in the sub-group, capacity of a radio access network that the devices in the sub-group access, and working loads of the devices in the sub-group.

In some example embodiments, means for transmitting the D2D route policy comprises means for transmitting the D2D route policy as part of UE Route Selection Policy.

In some example embodiments, means for transmitting the D2D route policy comprises means for transmitting the D2D route policy via a D2D PC3 interface.

In some example embodiments, means for generating the policy comprises: means for generating a third route rule for the at least one application; and means for assigning priorities to the first and third route rules, the priorities indicating an order in which the first and third route rules are to be performed by the second device.

In some example embodiments, the apparatus further comprises: means for obtaining the route selection criteria from one of the following: an application server associated with the at least one application, and a Policy Control Function device.

In some example embodiments, the route selection criteria are pre-configured.

In some example embodiments, the information concerning the second device comprises at least one of the following: capability information concerning the second device, indication concerning at least one D2D connection group to which the second device belongs, accounting information concerning the second device, a payment policy for the second device, usage of hardware resources on the second device, information concerning traffic on the second device, and information concerning the at least one application.

In some example embodiments, the information concerning the at least one application comprises at least one of the following: identifier of the at least one application, Quality of Service parameters for traffic of the at least one application, and security requirements associated with the at least one application.

In some example embodiments, the apparatus further comprises: means for creating a D2D profile for the second device based on the obtained information.

In some example embodiments, the policy further indicates actions associated with the at least one application.

In some example embodiments, the actions comprise at least one of the following: security check, encryption, data translation, and creation of new D2D communication.

In some example embodiments, means for generating the policy comprises: means for generating the policy in response to receiving a request for generating the D2D route policy from one of the following: an application server associated with the at least one application, a Policy Control Function device, a network device serving the second device, and the second device.

In some example embodiments, the apparatus is a Proximity-based Services device, and the second device is a terminal device.

In some example embodiments, an apparatus capable of performing any of the method 900 (for example, the second device 120) may comprise means for performing the respective steps of the method 900. The means may be implemented in any suitable form. For example, the means may be implemented in a circuitry or software module.

In some example embodiments, the apparatus comprises: means for receiving, at the apparatus in a D2D connection group, a D2D route policy for at least one application on the apparatus, the policy at least indicating route selection criteria for the group and D2D paths satisfying the route selection criteria, wherein the policy is generated based on proximity information for the group, information concerning the second device and the route selection criteria; and means for routing traffic of the at least one application in the D2D connection group based on the policy.

In some example embodiments, the apparatus further comprises: means for receiving from a first device a request for subscribing a status of the apparatus; and means for in response to a change in the status, transmit to the first device a notification indicating the change.

In some example embodiments, the status of the apparatus indicates at least one of the following: statuses of the D2D paths, statuses of traffic on the D2D paths, and an execution status of the policy.

In some example embodiments, the policy comprises a first route rule for the at least one application and a second route rule for the at least one application, the first and third route rules being assigned with priorities, the priorities indicating an order in which the first and second rules are to be performed by the apparatus.

In some example embodiments, means for routing traffic comprises: means for selecting one of the first and second route rules based on the priorities; and means for routing the traffic based on the selected route rule.

Figure 10:
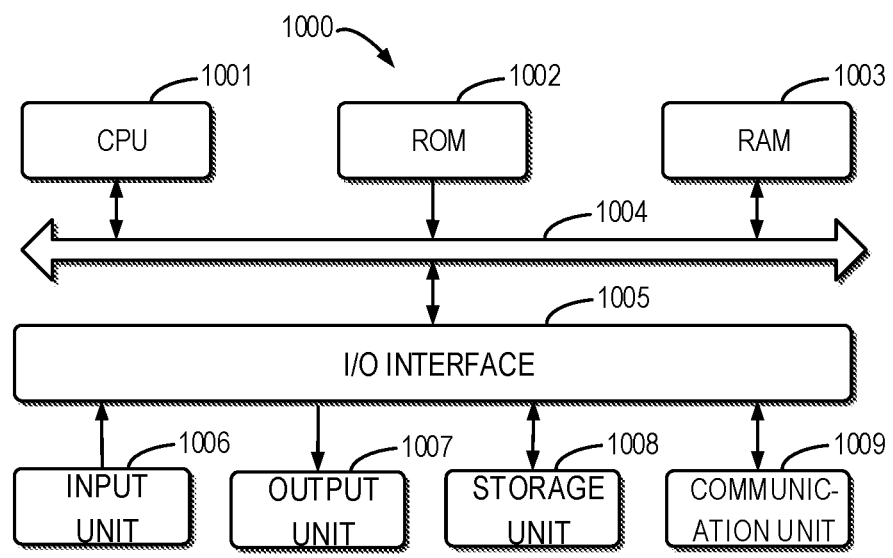
FIG. 10 illustrates a simplified block diagram of an apparatus that is suitable for implementing some embodiments of the present disclosure.

FIG. 10 illustrates a simplified block diagram of an apparatus that is suitable for implementing some other embodiments of the present disclosure. The device 1100 may be provided to implement a computing device, for example the first device 130 as shown in FIG. 1. The device 1000 may be used to implement the method 200 in FIG. 2.

As shown, the device 1000 includes a central processing unit (CPU) 1001 which performs various appropriate actions and processing, based on a computer program instruction stored in a read-only memory (ROM) 1002 or a computer program instruction loaded from a storage unit 1008 to a random access memory (RAM) 1003. The RAM 1003 stores therein various programs and data required for operations of the device 1000. The CPU 1001, the ROM 1002 and the RAM 1003 are connected via a bus 1004 with one another. An input/output (I/O) interface 1005 is also connected to the bus 1004.

The following components in the device 1000 are connected to the I/O interface 1005: an input unit 1006 such as a keyboard, a mouse and the like; an output unit 1007 including various kinds of displays and a loudspeaker, etc.; a storage unit 1008 including a magnetic disk, an optical disk, and etc.; and a communication unit 1009 including a network card, a modem, and a wireless communication transceiver, etc. The communication unit 1009 allows the device 1000 to exchange information/data with other devices through a computer network such as the Internet and/or various kinds of telecommunications networks.

The method 200 as described above may be executed by the processing unit 1001. For example, in some embodiments, the method 200 may be implemented as computer software programs or computer program products that are tangibly included in a machine readable medium, e.g., the storage unit 1008. In some embodiments, part or all of the computer programs may be loaded and/or mounted onto the device 1000 via ROM 1002 and/or communication unit 1009. When the computer program is loaded to the RAM 1003 and executed by the CPU 1001, one or more steps of the method 200 or 1000 as described above may be executed. Alternatively, in other embodiments, the CPU 1001 may be configured in any other appropriate manners (for example, by means of firmware) to perform the method 200.

Figure 11:
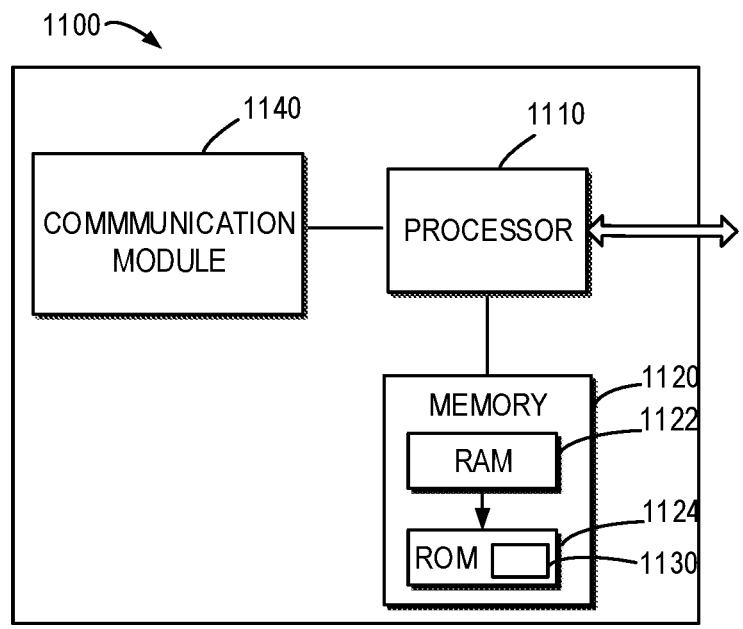
FIG. 11 illustrates a simplified block diagram of an apparatus that is suitable for implementing some other embodiments of the present disclosure.

FIG. 11 is a simplified block diagram of a device 1100 that is suitable for implementing embodiments of the present disclosure. The device 1100 may be provided to implement the communication device, for example any of the second devices 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIG. 9. The embodiments of the present disclosure may also be implemented by hardware or by a combination of software and hardware.

Figure 12:
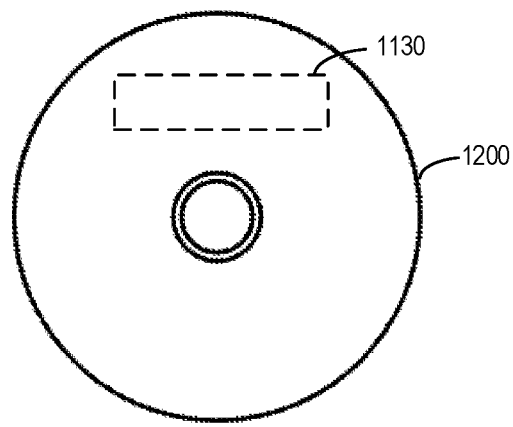
FIG. 12 illustrates a block diagram of an example computer readable medium in accordance with some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 and 1000 as described above with reference to FIGS. 9 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   the at least one memory and the computer program code configured to, with the at least one processor, cause the first device to:
   generate proximity information for a device-to-device, D2D, connection group;
   obtain information concerning a second device in the group;
   generate a D2D route policy for routing traffic of at least one application on the second device, based on the generated proximity information, the obtained information concerning the second device and route selection criteria for the at least one application, the policy at least indicating the route selection criteria and D2D paths satisfying the route selection criteria; and
   send the D2D route policy to be used by the second device to route traffic of the at least one application.

2. The first device of claim 1, wherein the first device is caused to generate the proximity information for the D2D connection group by:
   determining whether first proximity information for the second device is present;
   in response to a determination that the first proximity information is absent, transmitting a request for D2D discovery to the second device;
   receiving a response for D2D discovery from the second device; and
   generating the first proximity information based on the response.

3. The first device of claim 2, wherein the first device is further caused to:
   transmit to the second device a request for subscribing a status of the second device;
   receive from the second device a notification indicating a change in the status; and
   update the first proximity information for the second device based on the notification.

4. The first device of claim 3, wherein the first device is further caused to:
   update the policy based on the updated first proximity information.

5. The first device of claim 3, wherein the status of the second device indicates at least one of the following:
   statuses of the D2D paths,
   statuses of traffic on the D2D paths, and
   an execution status of the policy.

6. The first device of claim 1, wherein the first device is caused to generate the policy by:
   generating a first route rule for the at least one application, the first route rule indicating a first route selection criterion among the route selection criteria and a first D2D path among the D2D paths.

7. The first device of claim 1, wherein the first device is caused to send the D2D route policy by:
   sending the D2D route policy as part of UE Route Selection Policy.

8. The first device of claim 1, wherein the first device is caused to send the D2D route policy by:
   sending the D2D route policy via a D2D PC3 interface.

9. The first device of claim 1, wherein the information concerning the second device comprises at least one of the following:
   capability information concerning the second device,
   indication concerning at least one D2D connection group to which the second device belongs,
   accounting information concerning the second device,
   a payment policy for the second device,
   usage of hardware resources on the second device,
   information concerning traffic on the second device, and
   information concerning the at least one application.

10. The first device of claim 9, wherein the information concerning the at least one application comprises at least one of the following:
    identifier of the at least one application,
    Quality of Service parameters for traffic of the at least one application, and
    security requirements associated with the at least one application.

11. The first device of claim 1, wherein the policy further indicates actions associated with the at least one application, and the actions comprise at least one of the following:
- security check,
- encryption,
- data translation, and
- creation of new D2D communication.

12. The first device of claim 1, wherein the first device is a Proximity-based Services device, and the second device is a terminal device.

13. An apparatus, comprising:
- at least one processor; and
- at least one memory including computer program code;
- the at least one memory and the computer program code configured to, with the at least one processor, cause the apparatus in a device-to-device, D2D, connection group to:
  - receive a D2D route policy for routing traffic of at least one application on the apparatus, the policy at least indicating route selection criteria for the at least one application and D2D paths satisfying the route selection criteria, wherein the policy is generated based on proximity information for the group, information concerning the apparatus and the route selection criteria; and
  - route traffic of the at least one application based on the policy.

14. The apparatus of claim 13, wherein the policy comprises a first route rule for the at least one application and a second route rule for the at least one application, the first and second route rules being assigned with priorities, the priorities indicating an order in which the first and second rules are to be performed by the apparatus; and
- wherein the apparatus is caused to route traffic for the at least one application by:
  - selecting one of the first and second route rules based on the priorities; and
  - routing the traffic based on the selected route rule.

15. A method, comprising:
- generating, at a first device, proximity information for a device-to-device, D2D, connection group;
- obtaining information concerning a second device in the group;
- generating a D2D route policy for routing traffic of at least one application on the second device, based on the generated proximity information, the obtained information concerning the second device and route selection criteria for the at least one application, the policy at least indicating the route selection criteria and D2D paths satisfying the route selection criteria; and
- sending the D2D route policy to be used by the second device to route traffic of the at least one application.

16. A computer program embodied on a non-transitory computer-readable medium, said computer program comprising computer program code which, when executed on an apparatus, cause the apparatus to perform the method of claim 15.

17. A method, comprising:
- receiving, at an apparatus in a D2D connection group, a D2D route policy for routing traffic of at least one application on the apparatus, the policy at least indicating route selection criteria for the at least one application and D2D paths satisfying the route selection criteria, wherein the policy is generated based on proximity information for the group, information concerning the apparatus and the route selection criteria; and
- routing traffic of the at least one application based on the policy.

18. A computer program embodied on a non-transitory computer-readable medium, said computer program comprising computer readable code which, when executed on an apparatus, cause the apparatus to perform the method of claim 17.

* * * * *